(12) United States Patent
Sebor

(10) Patent No.: US 7,284,565 B2
(45) Date of Patent: Oct. 23, 2007

(54) FLUID FLOW REGULATOR FOR SWIMMING POOL CLEANING SYSTEM

(76) Inventor: Pavel Sebor, 751 Cricklewood Ter., Heathrow, FL (US) 32746

( * ) Notice: Subject to any disclaimer, the term of this patent is extended or adjusted under 35 U.S.C. 154(b) by 0 days.

(21) Appl. No.: 11/208,865

(22) Filed: Aug. 22, 2005

(65) Prior Publication Data

US 2006/0042688 A1    Mar. 2, 2006

Related U.S. Application Data

(60) Provisional application No. 60/605,785, filed on Aug. 31, 2004.

(51) Int. Cl.
  *G05D 11/00*    (2006.01)
  *E04H 4/16*    (2006.01)
(52) U.S. Cl. ............... 137/114; 137/527; 137/605; 137/907; 251/337; 15/1.7
(58) Field of Classification Search ............... 137/114, 137/527, 605, 907; 4/490, 504; 210/169
  See application file for complete search history.

(56) References Cited

U.S. PATENT DOCUMENTS

| | | | |
|---|---|---|---|
| 1,605,254 A * | 11/1926 | Martell | 137/114 |
| 3,817,278 A * | 6/1974 | Elliott | 137/527 |
| 4,368,751 A | 1/1983 | Chauvier | |
| 4,643,217 A | 2/1987 | Frentzel | |
| 4,729,406 A | 3/1988 | Frentzel | |
| 4,790,344 A | 12/1988 | Chauvier et al. | |
| 5,105,848 A | 4/1992 | Kallenbach | |
| 5,351,709 A | 10/1994 | Vos | |
| 5,363,877 A | 11/1994 | Frentzel et al. | |
| 5,570,713 A | 11/1996 | Stoltz et al. | |
| 5,737,791 A | 4/1998 | Durigon | |
| 5,904,171 A | 5/1999 | Stahle et al. | |
| 6,098,228 A | 8/2000 | Chang | |
| 6,112,354 A | 9/2000 | Stoltz et al. | |
| 6,125,492 A | 10/2000 | Prowse | |
| 6,314,983 B1 | 11/2001 | Hatch | |
| 6,357,478 B1 | 3/2002 | Campbell et al. | |
| 6,393,628 B1 * | 5/2002 | Kellogg | 4/490 |
| 6,495,034 B1 | 12/2002 | Schmidtke, deceased et al. | |
| 6,687,923 B2 | 2/2004 | Dick et al. | |

\* cited by examiner

*Primary Examiner*—Ramesh Krishnamurthy
(74) *Attorney, Agent, or Firm*—Allen, Dyer, Doppelt, Milbrath & Gilchrist, P.A.

(57) ABSTRACT

A fluid flow regulator useful with swimming pool suction cleaners includes a flow passage conduit for connection between a suction pump and the pool cleaner. A flow bypass conduit is connected to the flow passage conduit for injecting an ambient fluid into a bypass flow passage. A valve operates within the bypass flow passage with a spring carried entirely within the bypass passage for urging the valve toward a seated position. An adjustment knob acts on the spring for modifying a biasing force on the valve urging the valve toward the seated position in opposition to a pressure from a fluid flow within the flow passage urging the valve to the open position.

18 Claims, 5 Drawing Sheets

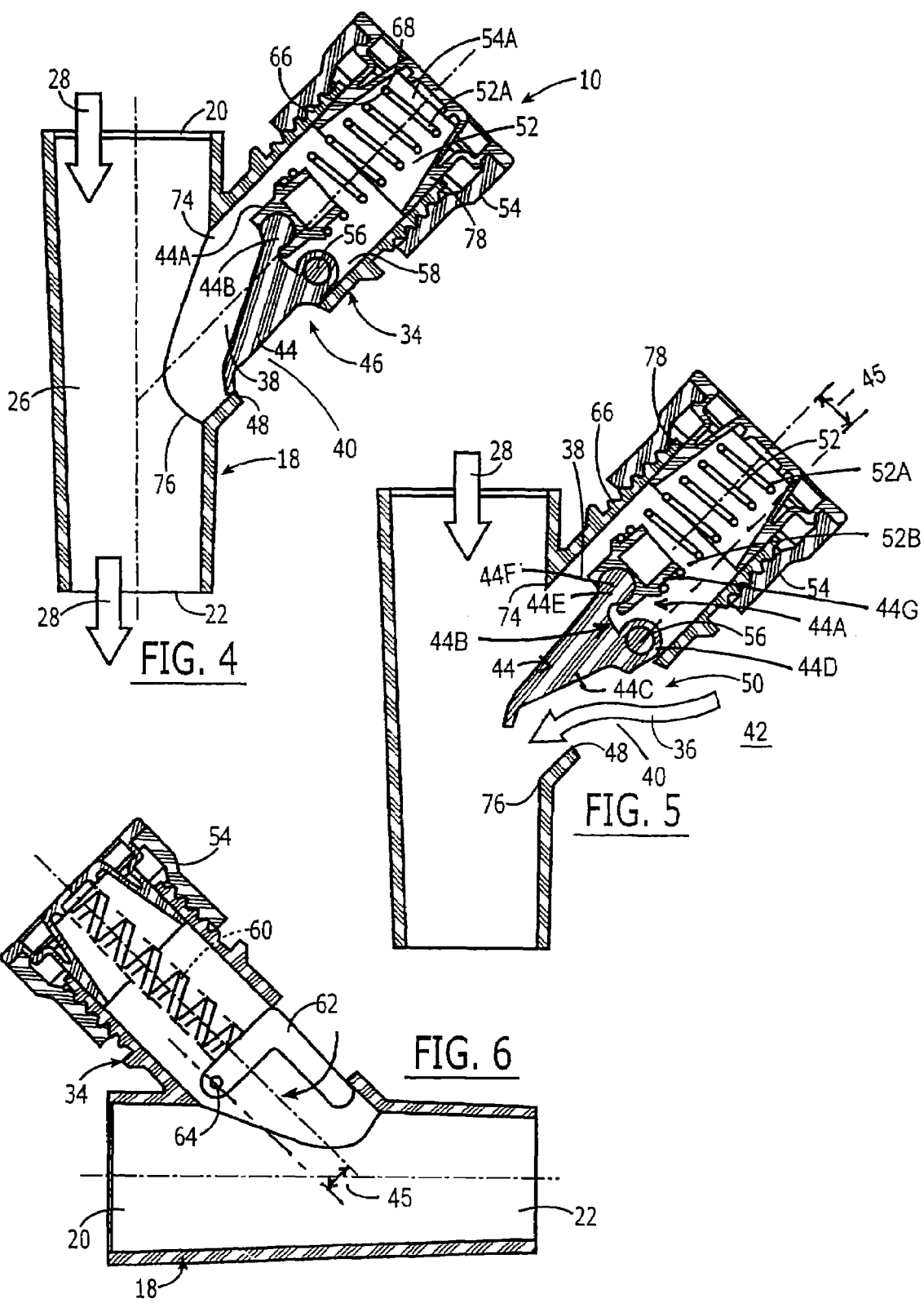

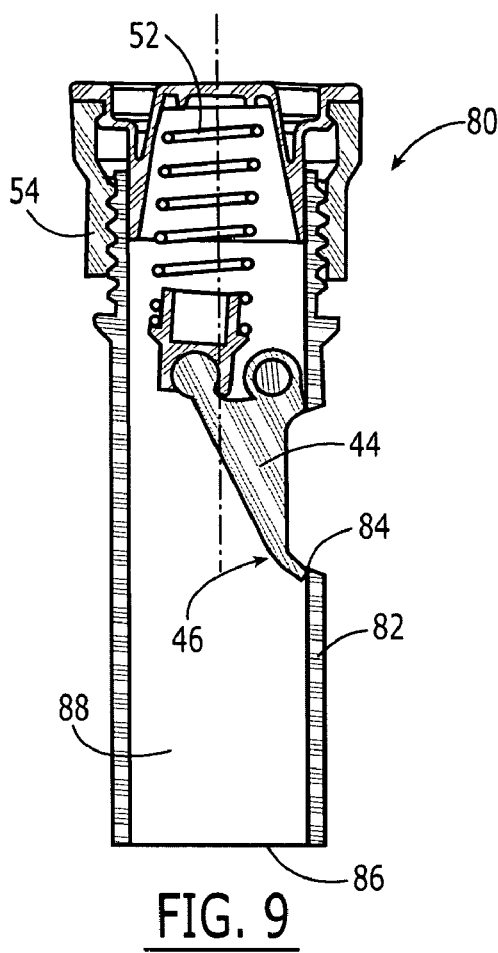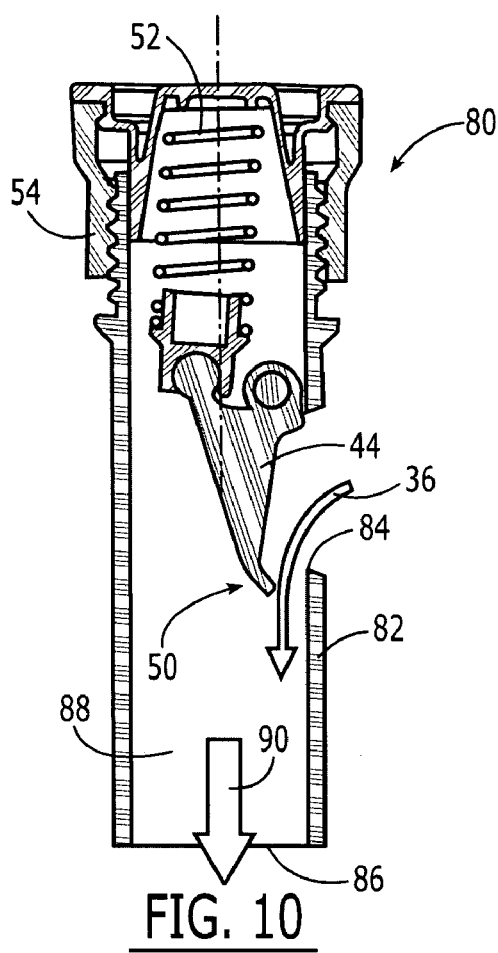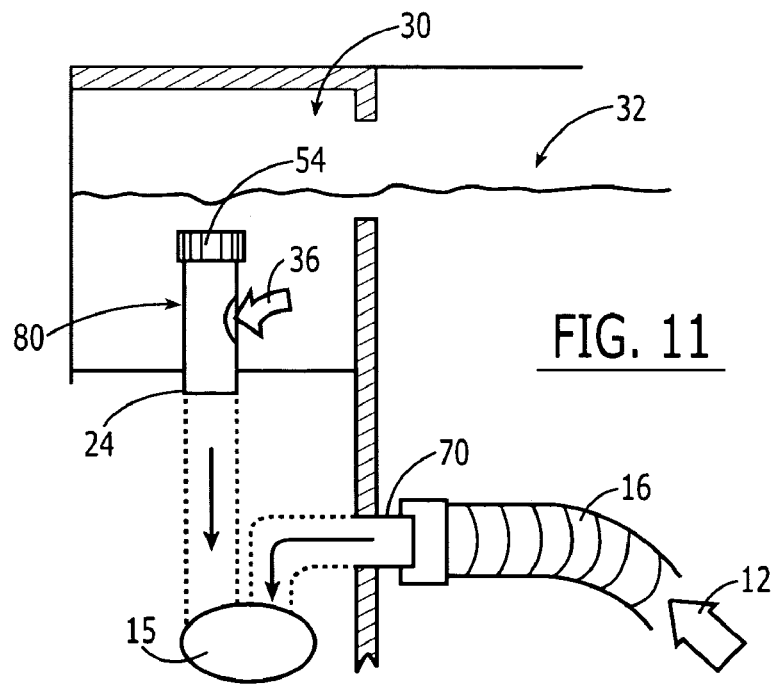

FLUID FLOW REGULATOR FOR SWIMMING POOL CLEANING SYSTEM

CROSS REFERENCE TO RELATED APPLICATION

This U.S. Application claims priority to U.S. Provisional Patent Application Ser. No. 60/605,785 filed Aug. 31, 2004 for "Suction Pressure Regulator and Method for Swimming Pool Cleaning System," the disclosure of which is hereby incorporated herein by reference in its entirety.

FIELD OF THE INVENTION

The present invention generally relates to swimming pool cleaning systems including cleaning devices adapted for travel over submerged surfaces of a swimming pool for vacuuming accumulated debris. More particularly, the present invention is directed to a flow controller and vacuum pressure adjustment for installation within a flexible hose portion of the cleaning system.

BACKGROUND OF THE INVENTION

By way of example, swimming pool cleaning devices as described in U.S. Pat. No. 6,751,822 for a "Submerged Surface Pool Cleaning Device" and U.S. Pat. No. 5,974,647 for a "Vibratory Oscillating Swimming Pool Cleaner Employing Means for Facilitating Self Starting and for Avoiding Clogging," are well known in the art. Such self-propelled swimming pool cleaning devices rely on the pressure of vacuum from the pool cleaning pump system for movably adhering to the submerged surface being cleaned. Further, the level of vacuum created will typically affect performance of the swimming pool cleaning device where such performance relies on the speed with which the device moves along the submerged surface and the vacuum created at the device for allowing the device to work its way along submerged vertical surfaces of a swimming pool, by way of example. While pump systems may be regulated, there is a need to provide an intermediate regulation of the pressure or vacuum delivered to the swimming pool cleaner such that a consumer may easily adjust such vacuum for a desired performance of the swimming pool cleaning device.

SUMMARY OF THE INVENTION

The present invention is directed to regulator valves for use with swimming pool vacuuming systems. By incorporating a regulator valve operable with the vacuum hose between a vacuum inlet of a swimming pool and a pool cleaner, the vacuum or pressure created at the pool cleaner may be adjusted. Further, by including a vacuum test gauge at the swimming pool cleaner, a preferred vacuum may be selected by using a vacuum test gauge calibrated for the specific pool cleaner selected by the consumer.

A fluid flow regulator in keeping with the teachings of the present invention, may include a first conduit providing a flow passage therethrough from an inlet to an outlet, the first conduit having an aperture therein between the inlet and the outlet, a second conduit extending from the aperture and providing a bypass flow passage thereto, a valve operable within the bypass flow passage and outside the flow passage for movement between a closed position, wherein fluid flow from the bypass flow passage to the flow passage through the aperture is ceased when the valve is in the closed position, biasing means carried entirely within the bypass passage for urging the valve toward the closed position, and an adjustment member carried by the second conduit for movement toward and away from the valve, the adjustment member operable with the biasing means for modifying a biasing force on the valve urging the valve toward the closed position in opposition to a pressure from a fluid flow within the passage urging the valve to the open position.

Another fluid flow regulator in keeping with the teachings of the present invention may include a conduit having an inlet and an outlet defining a flow passage extending therebetween for fluid flow therethrough, a valve operable within the flow passage for movement between a closed position seated about a periphery of the inlet and an open position removed therefrom with the valve in a spaced relation to the valve seat, biasing means operable with the valve for urging the valve toward the closed position by applying a biasing force thereto, wherein pressure within the flow passage urges the valve toward the open position drawing against the biasing force urging the valve toward the closed position, and an adjustment member carried by the conduit and operable with the biasing means for adjustably setting a magnitude of the biasing force by movement of the adjustment knob toward and away from the valve.

BRIEF DESCRIPTION OF THE FIGURES AND PHOTOS

Embodiments of the present invention are described by way of example with reference to the following drawings and annotated photographs.

FIG. 4 is a cross-sectional view of the regulator of FIG. 1 taken through lines 4-4 of FIG. 2;

FIG. 5 is a cross-sectional view as in FIG. 4, illustrating the valve in an open position;

FIG. 6 is a cross-sectional view of a regulator using an alternate arrangement for the valve and tension spring biasing the valve;

FIGS. 9 and 10 are cross sectional views of an alternate embodiment of a regulator useful with a skimmer and dedicated vacuum line for the pool cleaner;

FIG. 11 is a diagrammatical illustration of one use of the regulator of FIG. 9, by way of example;

DETAILED DESCRIPTION OF THE PREFERRED EMBODIMENTS

The present invention will now be described more fully with reference to the accompanying drawings, in which preferred embodiments of the invention are shown. However, this invention may be embodied in many different forms and should not be construed as limited to the embodiments set forth herein. Rather, these embodiments are provided so that this disclosure will be thorough and complete, and will fully convey the scope of the invention to those skilled in the art.

Figure 1:
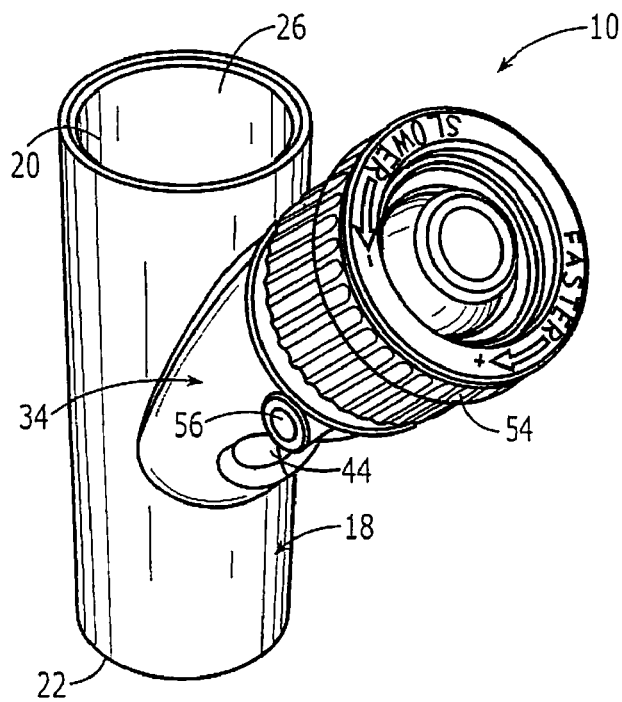
FIG. 1 is a perspective view of one embodiment of a fluid flow regulator in keeping with the teachings of the present invention.
Figure 2:
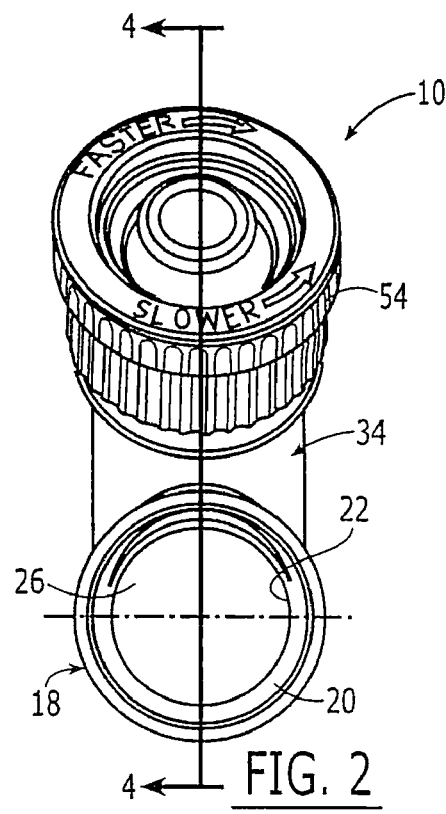
FIG. 2 is a front elevation view of the embodiment of FIG. 1.

With reference initially to FIGS. 1 and 2, one embodiment of the invention may be described as a fluid flow regulator 10 useful in controlling suction 12 is a swimming pool cleaner 14 operable with a pump 15 through a vacuum hose 16. With continued reference to FIGS. 1 and 2, and to FIG. 3, the regulator 10 may be described as including a first conduit 18 including an inlet 20 for connection to the pool cleaner 14 using the vacuum hose 16, an outlet 22 for connection to the suction pump 15 using a skimmer port 24 and a flow passage 26 extending therebetween, as illustrated with reference to FIG. 4, for a fluid flow 28 therethrough from the pool cleaner 14 to the skimmer port 24 at a skimmer 30 of a swimming pool 32, and to the pump 15.

With continued reference to FIGS. 1 and 4, the regulator 10 as herein described, includes a second conduit 34 operable with the first conduit 18 for providing a bypass flow 36. The second conduit 34 includes a bypass passage 38 connected to the flow passage 26, with a connection between the inlet 20 and the outlet 22. The bypass passage 38 includes an aperture 40 for allowing ambient fluid 42 to flow, as illustrated with reference again to FIG. 3 and to FIG. 5, such as within the skimmer 30 and outside the flow passage 26 of the first conduit 18.

With reference again to FIGS. 4 and 5, a valve 44 is operable within the bypass passage 38 and outside the flow passage 26 for movement between a closed position 46 when seated against a periphery of the aperture defining a valve seat 48 and an open position 50 removed from the seat with the valve in a spaced relation to the valve seat. The flow passage 26 is isolated from the ambient fluid 42 when the valve 44 is in the closed position 46 seated with the valve seat 48. Biasing means, herein embodied in a coil spring 52 is carried within the bypass passage 38 for urging the valve 44 toward the closed position 46 by applying a biasing force to the valve, wherein pressure within the second conduit 34 urges the valve toward the open position 50 by drawing against the biasing force urging the valve toward the closed position.

With reference again to FIGS. 1, 2, 4, and 5, an adjustment knob 54 is carried by the second conduit 34 and operable with the spring 52 for adjustably setting a magnitude of the biasing force by movement of the adjustment knob toward and away from the valve 44.

While a compression coil spring 52 is herein described with the valve 44 hinged about a pivot pin 56 mounted on an inner wall 58 of the second conduit 34 upstream the aperture 40, alternative embodiments will come to the minds of those skilled in the art, now having the benefit of the teachings of the present invention. By way of example, and with reference to FIG. 6, a tension spring 60 may be used with a valve 62 having pivoting about an alternate pivot point 64 within the second conduit 34. With continued reference to FIG. 6 and again to FIG. 5, and for embodiments herein described by way of example, the valve 44 pivots about the pivot pin 56 (FIG. 5) and the pivot pin 64 (FIG. 6) wherein both the tension spring 60 and the compression coil spring 52 are structured so as to bias against the respective valves 44, 62 at a location on the valve 44 offset 45 from the respective pivot pins 56, 64. With continued reference to FIG. 5, by way of example, the valve 44 may be described as including a valve body 44C pivotal about a proximal end 44D thereof and a valve stem 44B extending from the valve body. The valve stem 44B is operable with the spring 52, and thus provides a mechanical advantage for the biasing through a moment arm formed thereby. The valve body 44C is operable with the valve seat 48.

With reference again to FIGS. 1, 2, 4 and 5, the second conduit 34 herein described as having a circular cross section, includes a threaded outside wall 66 with the adjustment knob 54 having internal threads for cooperating with the threaded outside wall and operating in moving the knob toward and away from the valve 44. As illustrated with reference again to FIGS. 1 and 2, rotating the knob 54 clockwise or counterclockwise allows more or less bypass flow into the flow passage thus causing the pool cleaner to move more slower or faster, as desired.

Figure 3:
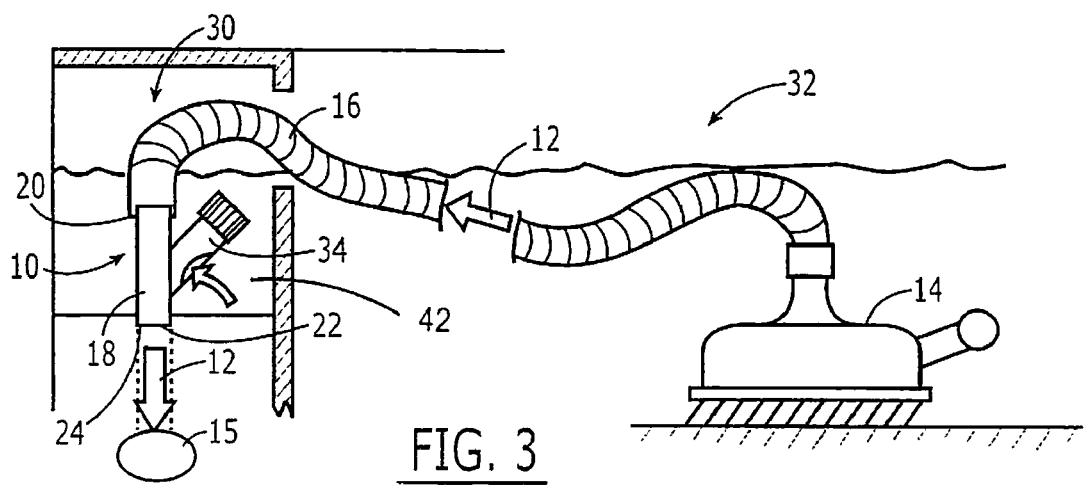
FIG. 3 is a diagrammatical illustration of one use of the regulator of FIG. 1, by way of example.

With reference again to FIGS. 4 and 5, the embodiment of the regulator 10 herein described by way of example, may be further described as including five apertures for operating with the swimming pool cleaner 14 using the vacuum hose 16 connected to the skimmer port 24, earlier described with reference to FIG. 3. A first aperture is the inlet 20 of the first conduit 18 to which the hose 16 is connected. If a dedicated suction line 70 is available for use by the pool cleaner 14, the first aperture, the inlet 20 may be blocked using a stopper 72, as illustrated with reference to FIG. 7, and the hose 16 connected to the dedicated line 70, as illustrated with reference to FIG. 8. With continued reference to FIGS. 4 and 5, a second aperture is provided by the outlet 22 of the first conduit 18 connected to the skimmer port 24 operable with the swimming pool system pump 15. The first conduit provides a connection between the pool cleaner vacuum hose 16 and the skimmer port 24 operable with the pump 15. A third aperture 74 is located in a side wall 76 of the first conduit 18 between the inlet 20 and the outlet 22, between the first and second apertures, and provides the bypass flow 36 from the source of the ambient fluid 42, such as the free standing water in the swimming pool 32, into the flow passage 26, thus affecting the suction at the pool cleaner 14 created by the pump 15. To control suction at the pool cleaner 14, other than by varying operation at the pump 15, the effective size of the opening of the third aperture 74 is modified. To avoid having mechanical parts within the flow passage 26, the second conduit 34 provides the bypass passage 38 extending outwardly from the third aperture 74. The second conduit 34 including a fourth aperture, the aperture 40 earlier described for the embodiment herein described, is operable with the valve 44 for controlling bypass fluid flow 36 of the ambient fluid 42 into the flow passage 26. When the valve 44 is seated, the bypass flow 36 is stopped, and the suction provided to the pool cleaner 14 is as set by the swimming pool operating system. As the valve 44 is moved away from its seated position, the bypass flow 36 of the ambient fluid 42 is introduced into the flow passage 26, thus decreasing the suction 12 at the pool cleaner 14.

By way of example, should debris be sucked through the fourth aperture, the aperture 40 and be lodged against the valve 44, the valve must be moved. To accommodate such a situation, the spring 52 is used to bias the valve 44 toward the seat 48. The use of the spring 52 allows for an automatic adjustment to the position of the valve 44 as debris causes changes in the opposing forces between the spring bias against the valve and the opposing suction. Therefore, with a preset biasing set by the spring 52 and use of the adjustment knob 54 desirable for the suction 12 to operate the pool cleaner 14 effectively, should debris cause a blockage in the system or at the valve, the valve will exert an added force against the spring causing it to flex (compress and extend depending on the embodiment in use), thus maintaining the desired suction at the pool cleaner.

Yet further with regard to a view toward apertures, a fifth aperture 78 located in the second conduit 34 is used to access the interior of the second conduit and components such as the valve 44 and the spring 52. For the embodiment herein described by way of example, the portion of the second conduit proximate the fifth aperture is threaded as above described for receiving a the threaded adjustment knob 54. In addition to allowing a continuous adjustment via the threads, the knob 54 may be removed for ease in accessing the spring 52 and valve 44 should it be necessary to remove unwanted debris.

Figure 7:
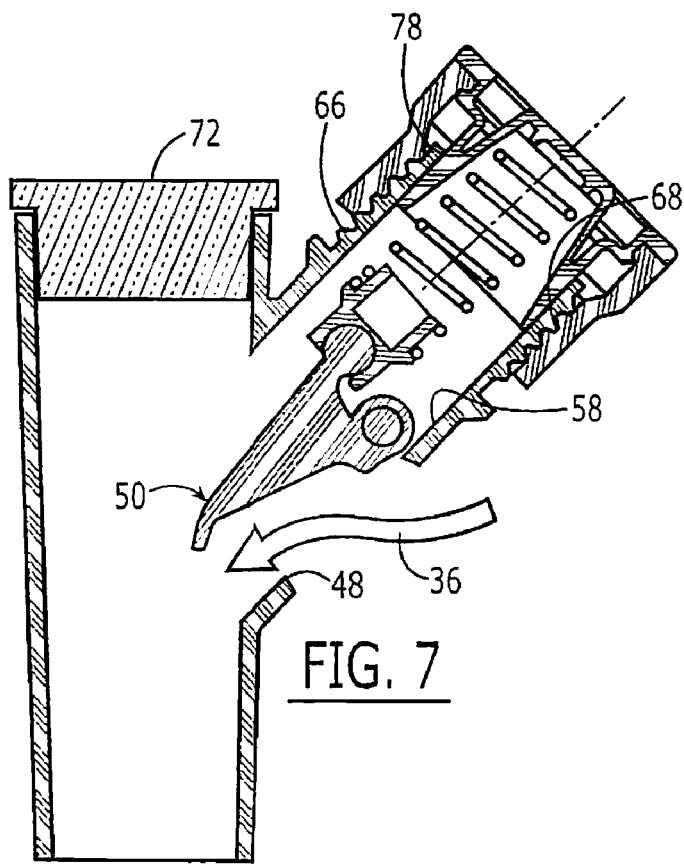
FIG. 7 is a cross-sectional view of the embodiment of FIG. 1, illustrating use with a stopper for blocking an inlet.
Figure 8:
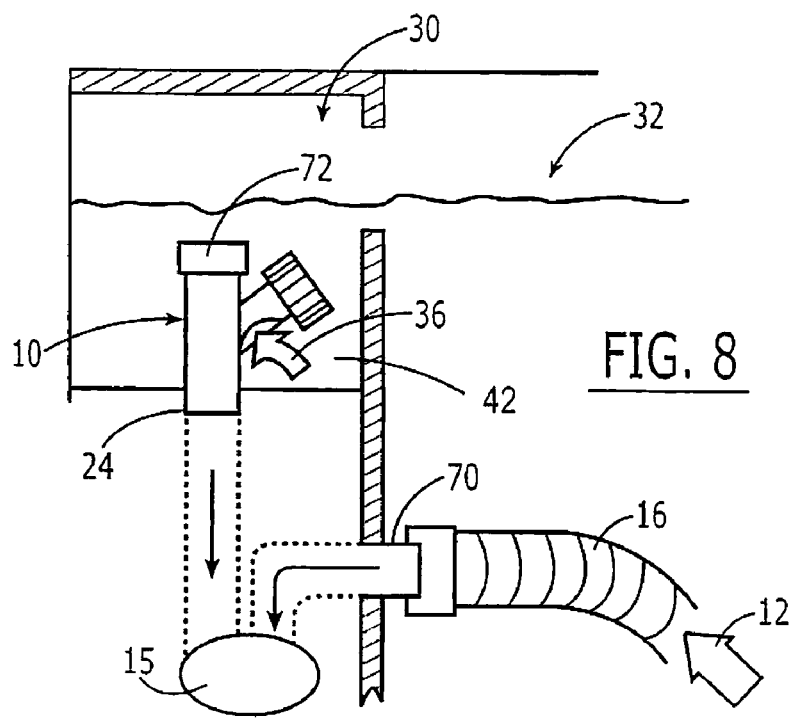
FIG. 8 is a diagrammatical illustration of one use of the regulator configured as in FIG. 7, by way of example.

As earlier described with reference to FIGS. 7 and 8, the inlet 20 may be blocked using the stopper 72 when the regulator 10 is used at the skimmer 30 and the vacuum hose 16 is connected to the dedicated suction line 70. Alternatively, one embodiment as herein described with reference to FIGS. 9 and 10, and in keeping with the teachings of the present invention, the regulator 80 may include a conduit 82 having an inlet 84 and an outlet 86 defining a flow passage 88 for fluid flow 90 through the passage. The valve 44 is herein operable within the flow passage 88 for movement between the closed position 46 and the open position 50. The spring 52 is operable with the valve 44, as above described for urging the valve toward the closed position by applying a biasing force thereto, wherein pressure within the flow passage urges the valve toward the open position drawing against the biasing force urging the valve toward the closed position. The adjustment knob 54 adjustably sets a magnitude of the biasing force by movement of the adjustment knob toward and away from the valve.

As herein described, by way of example and with reference again to FIG. 4, one embodiment of the valve 44 includes use of a ball joint 44A for connection of a valve end 52B of the coil spring 52 and the stem 44B of the valve. The ball joint 44A as herein described by way of example, comprises a ball portion 44F affixed to the stem 44B distal end 44E is rotatably connected with a carrier 44G, which carrier receives the valve end 52B of the spring 52. The opposing end 52A of the spring 52 is received within the inside cavity 54A of the knob 54. An opposing end 52A of the coil spring 52 is carried within a knob cavity 54A such that rotation of the adjustment knob 54 allows the coil spring 52 to stay within the cavity while biasing against the ball joint 44A. The valve 44 is thus pivotal about the valve pivot pin 56.

Figure 12:
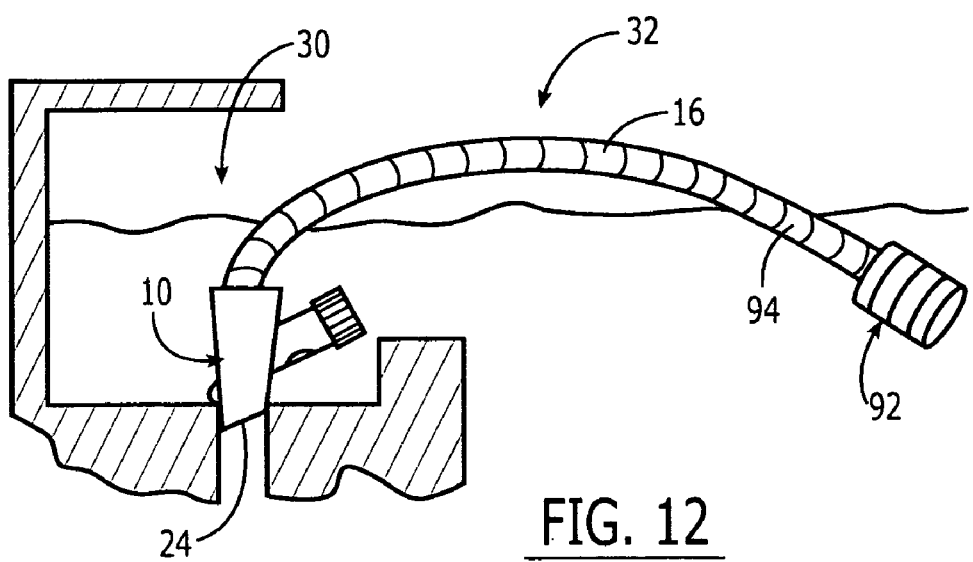
FIG. 12 is a diagrammatical illustration of a vacuum test gauge used with the regulator of FIG. 1, by way of example.
Figure 12A:
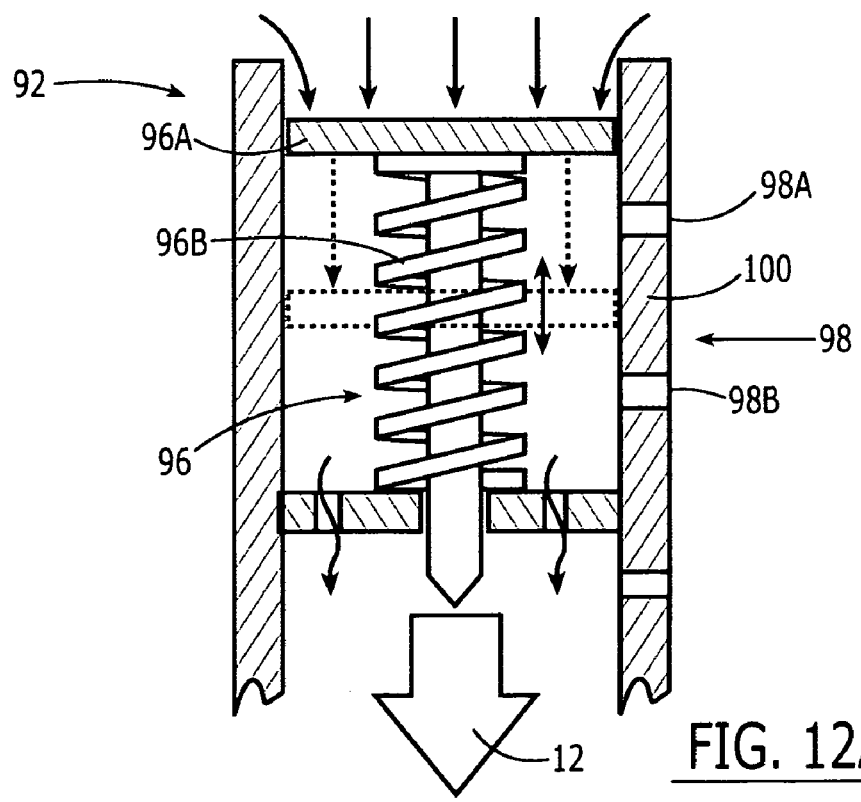
FIG. 12A is a partial cross-sectional view of one embodiment of the vacuum test gauge in FIG. 12.

With reference to FIGS. 12 and 12A, a vacuum test gauge 92 may be placed at the pool cleaner end 94 of the vacuum hose 16 for adjusting the regulator valve 10 to provide a desired vacuum at the pool cleaner end of the vacuum hose. Use of the vacuum gauge 92 as herein described allows a consumer to select a pressure or vacuum that is recommended for the swimming pool cleaner 14 being used. As illustrated by way of example with reference to FIG. 12A, the vacuum test gauge 92 may have a piston styled mechanism 96 employing a piston 96A an spring 96B for providing a minimum 98A and maximum 98B for defining a preferred pressure range 98 useful with the particular swimming pool cleaner as viewed through a transparent side wall 100 of the gauge. The gauge may also be used when the dedicated line is used, as earlier described with reference to FIGS. 8 and 11. When a desired adjustment to the vacuum is made, the vacuum gauge 92, as herein described by way of example, is removed and the hose 16 connected to the swimming pool cleaner 14 for operation.

Many modifications and other embodiments of the invention will come to the mind of one skilled in the art now having the benefit of the teachings presented in the foregoing description and associated drawings and photographs. The embodiments shown in the accompanying drawings and described herein are offered by way of illustration only. Therefore, it is to be understood that the invention is not to be limited to the specific embodiments enclosed, and that modifications and alternate embodiments are intended to be included within the scope of the claims herein presented.

That which is claimed is:

1. A fluid flow regulator comprising:
    a first conduit providing a flow passage therethrough from an inlet to an outlet, the first conduit having an aperture therein between the inlet and the outlet;
    a second conduit extending from the aperture and providing a bypass flow passage thereto;
    a valve operable within the bypass flow passage and outside the flow passage for movement between a closed position and an open position, wherein fluid flow from the bypass flow passage to the flow passage through the aperture is ceased when the valve is in the closed position, and wherein the valve is hinged to a wall of the second conduit upstream the aperture;
    a spring carried entirely within the bypass passage, the spring applying a biasing force to the valve so as to bias the valve toward the closed position, wherein the biasing force is applied to the valve at a location offset from an axis of rotation thereof; and
    an adjustment member carried by the second conduit and operable with the spring, the adjustment member operably moveable toward and away from the valve for modifying the biasing force thereon.

2. A regulator according to claim 1, wherein the spring comprises a tension spring.

3. A regulator according to claim 1, wherein the spring comprises a compression spring.

4. A regulator according to claim 1, wherein the spring is a coil spring.

5. A regulator according to claim 1, wherein the adjustment member comprises a knob rotatably carried by the second conduit.

6. A regulator according to claim 1, wherein the second conduit includes threads formed therewith, and wherein the adjustment member is threaded for cooperating with the threads of the second conduit for operation therewith in moving the adjustment member toward and away from the valve.

7. A regulator according to claim 1, further comprising a stopper removably affixed to the first conduit for blocking fluid flow through the inlet.

8. A fluid flow regulator useful in controlling suction is a swimming pool cleaner, the fluid flow regular comprising:
    a first conduit including an inlet adapted for connection to a swimming pool cleaner through a vacuum hose, an outlet for connection to a suction line to a pump, and a flow passage extending therebetween for fluid flow therethrough from the pool cleaner to the pump;
    a second conduit operable with the first conduit for providing a bypass flow thereto, the second conduit having a bypass passage in a fluid connection to the flow passage, the bypass passage having an aperture for access to an ambient fluid outside the flow passage;
    a valve operable within the bypass passage and outside the flow passage for movement between a closed position seated against a periphery of the aperture defining a valve seat and an open position removed therefrom with the valve in a spaced relation to the valve seat, wherein the valve is pivotal about a proximal end thereof, and wherein the flow passage is isolated from the ambient fluid when the valve is in the closed position;

biasing means carried within the bypass passage for urging the valve toward the closed position by applying a biasing force thereto, wherein the biasing force is applied to the valve at a location offset from the proximal end, and wherein pressure within the housing urges the valve toward the open position drawing against the biasing force urging the valve toward the closed position; and an adjustment knob carried by the second conduit and operable with the biasing means for adjustably setting a magnitude of the biasing force by movement of the adjustment knob toward and away from the valve for controlling flow of the ambient fluid into the flow passage and thus a suction therein.

9. A regulator according to claim 8, wherein the valve proximal end is hinged to a wall of the second conduit upstream the aperture.

10. A regulator according to claim 8, wherein the biasing means comprises a compression spring.

11. A regulator according to claim 8, wherein the second conduit includes threads formed therewith, and wherein the adjustment knob is threaded for cooperating with the threads of the second conduit for operation therewith in moving the knob toward and away from the valve.

12. A regulator according to claim 8, further comprising a stopper removably affixed to the first conduit for blocking fluid flow through the inlet.

13. A fluid flow regulator comprising:
a first conduit providing a flow passage therethrough from an inlet to an outlet, the first conduit having an aperture therein between the inlet and the outlet;
a second conduit extending from the aperture and providing a bypass flow passage thereto;
a valve carried within the second conduit and pivotal about a proximal end thereof between a closed position, wherein fluid flow from the bypass flow passage to the flow passage through the aperture is ceased when the valve is in the closed position;
biasing means carried entirely within the second conduit and operable with the valve for urging the valve toward the closed position, the biasing means applying a biasing force onto the valve at a location offset from the valve proximal end; and
an adjustment member carried by the second conduit and operable with the biasing means urging the valve toward the closed position in opposition to a pressure from a fluid flow within the passage urging the valve to the open position, the adjustment member operably moveable toward and away from the valve for modifying a biasing force thereon, wherein movement of the adjustment member toward the valve increases the biasing force and movement away from the valve decreases the biasing force.

14. A fluid flow regulator useful in controlling suction is a swimming pool cleaner, the fluid flow regular comprising:
a first conduit including an inlet adapted for connection to a swimming pool cleaner through a vacuum hose, an outlet for connection to a suction line to a pump, and a flow passage extending therebetween for fluid flow therethrough from the pool cleaner to the pump;

a second conduit operable with the first conduit for providing a bypass flow thereto, the second conduit having a bypass passage in a fluid connection to the flow passage, the bypass passage having an aperture for access to an ambient fluid outside the flow passage;

a valve operable for movement between a closed position seated against a periphery of the aperture defining a valve seat and an open position removed therefrom with the valve in a spaced relation to the valve seat, wherein the valve is pivotal about a proximal end thereof, and wherein the flow passage is isolated from the ambient fluid when the valve is in the closed position;

a spring urging the valve toward the closed position by applying a biasing force thereto, wherein the biasing force is applied to the valve at a location offset from the proximal end, and wherein pressure within the housing urges the valve toward the open position drawing against the biasing force urging the valve toward the closed position; and an adjustment knob carried by the second conduit and operable with the spring for adjustably setting a magnitude of the biasing force by movement of the adjustment knob toward and away from the valve for controlling fluid flow through the flow passage.

15. A regulator according to claim 14, wherein the valve proximal end is hinged upstream the aperture.

16. A regulator according to claim 14, wherein the spring comprises at least one of a compression spring and a tension spring.

17. A regulator according to claim 14, wherein the second conduit includes threads formed therewith, and wherein the adjustment knob is threaded for cooperating with the threads of the second conduit for operation therewith in moving the knob toward and away from the valve.

18. A fluid flow regulator comprising:
a first conduit providing a flow passage therethrough from an inlet to an outlet, the first conduit having an aperture therein between the inlet and the outlet;
a second conduit extending from the aperture and providing a bypass flow passage thereto;
a valve operable within the bypass flow passage and outside the flow passage for movement between a closed position and an open position, wherein fluid flow from the bypass flow passage to the flow passage through the aperture is ceased when the valve is in the closed position;
a spring carried within the bypass passage, the spring biasing the valve toward the closed position, wherein pressure within the flow passage urges the valve toward the open; and
an adjustment knob carried by the second conduit and operable with the spring, wherein the adjustment knob is manually moveable toward and away from the valve for setting a magnitude of the biasing of the spring on the valve, and wherein the conduit includes threads formed on at least one of an outside surface and an inside surface thereof, and wherein the adjustment knob is threaded on at least one of an inside surface and an outside surface thereof for cooperating with the threads of the conduit and operation therewith in moving the adjustment knob toward and away from the valve.

* * * * *